United States Patent [19]

Rapp et al.

[11] Patent Number: 5,658,836

[45] Date of Patent: Aug. 19, 1997

[54] MINERAL FIBERS AND THEIR COMPOSITIONS

[75] Inventors: Charles F. Rapp; Carl R. Strauss; Neil M. Cameron, all of Granville, Ohio

[73] Assignee: Owens-Corning Fiberglas Technology, Inc., Summit, Ill.

[21] Appl. No.: 566,530

[22] Filed: Dec. 4, 1995

[51] Int. Cl.⁶ .......................... C03C 13/06; B32B 17/02
[52] U.S. Cl. .......................... 501/36; 428/378; 428/389
[58] Field of Search .................... 501/36; 428/378, 428/389

[56] References Cited

U.S. PATENT DOCUMENTS

| | | |
|---|---|---|
| 4,194,914 | 3/1980 | Moriya et al. . |
| 4,366,251 | 12/1982 | Rapp . |
| 4,381,347 | 4/1983 | Carbol ................................ 501/36 |
| 4,560,606 | 12/1985 | Rapp et al. . |
| 5,250,488 | 10/1993 | Thelohan et al. . |
| 5,312,806 | 5/1994 | Mogensen . |
| 5,332,699 | 7/1994 | Olds et al. ............................. 501/36 |

*Primary Examiner*—Karl Group
*Attorney, Agent, or Firm*—C. Michael Gegenheimer; Curtis B. Brueske

[57] ABSTRACT

Mineral fiber compositions with increased levels of $SiO_2$ and reduced levels of $Al_2O_3$ and $Fe_2O_3$ compositions are suitable for insulation. The compositions have high temperature resistance and high biosolubility, yet have properties which allow current processes to fabricate them into insulation. The mineral fibers also meet proposed German regulations regarding $K1 \geq 40$.

17 Claims, No Drawings

MINERAL FIBERS AND THEIR COMPOSITIONS

TECHNICAL FIELD

This invention relates to mineral fibers and their compositions. In particular, this invention relates to high temperature resistant mineral fibers which have high biosolubility.

BACKGROUND OF THE INVENTION

Mineral fiber insulation is well known and has been a commercial product for a long period of time. The insulation is made from rock or slag fibers often referred to as mineral wool or rockwool.

Research has established that asbestos fibers when inhaled can cause significant disease in man. Though the exact mechanisms responsible for the biological activity of inhaled asbestos fibers is unknown, it is widely believed that their ability to remain in the lung for extended periods of time is an important factor. Mineral fibers have not been linked to disease in man. Additionally, their durability or residence time in the lung appears much less than asbestos fibers.

As an added precaution, however, the German government has proposed regulations for mineral fibers. Mineral fiber compositions meeting the regulations are considered to be free of suspicion. The problem, however, for the manufacturer is to produce fibers which meet the regulations and standard criteria. These fibers must meet the proposed regulations, be fiberizable in standard rockwool processes, have sufficient durability and have acceptable insulating properties.

An important use of mineral fiber insulation is as a fire barrier in buildings. To perform properly in this application, the mineral fiber must have a high temperature resistance. Most mineral wools with a high temperature resistance contain high mounts of iron oxides (4 to 12 weight percent). The iron oxide acts as a nucleating agent so that the fiber will crystallize rather than melt during a fire. This high amount of iron oxide also reduces the high temperature viscosity of the melt and can make fiber forming difficult. This is particularly true for compositions formulated with very high mounts of CaO+MgO to give a high biosolubility.

DISCLOSURE OF INVENTION

This invention involves mineral wools and mineral wool products with a high temperature resistance, but with a low iron content. The high temperature resistance is obtained through the use of other bulk nucleating agents, such as FeS and surface coatings, such as ammonium phosphate. Our composition produces a mineral wool or mineral wool product with a high biosolubility and a high temperature resistance.

The German regulations state that mineral wools should contain very high mounts of alkali and alkaline earth oxides to give the fibers a very high biosolubility. The regulations propose that the composition contain sufficient CaO+MgO+Na$_2$O+K$_2$O+BaO+B$_2$O$_3$ so that this sum minus two times the Al$_2$O$_3$ is at least 40 weight percent. An undesirable feature of these highly soluble compositions is their low viscosities at the forming temperature.

BEST MODE FOR CARRYING OUT THE INVENTION

We have developed compositions which meet the proposed German criteria of high biosolubility. Although the forming properties of these compositions are somewhat inferior to the standard rockwool, they can be formed by standard mineral wool forming processes. However, the fibers do not have good high temperature performance. Addition of high amounts of iron oxide to improve the high temperature "fire" performance of the fibers will further decrease the high temperature viscosity and degrade the fiber forming properties of the melt. The iron substitution is made for SiO$_2$ to keep the solubility index at 40 weight percent.

We also have discovered that fibers produced from these low iron compositions can be made to perform well in simulated fire tests through the use of other nucleating agents and coatings. For example, if the compositions are melted under highly reducing conditions, the high temperature performance improves. Further, addition of a small amount of sulfide (0.4 weight percent added as FeS) further improves the high temperature performance. When these fibers were coated with (NH$_4$)$_2$ HPO4, the high temperature performance was also significantly improved. In fact, the fibers containing FeS, when coated with 3.6 weight percent (NH$_4$)$_2$ HPO$_4$ performed as well in a simulated fire test as the "standard" mineral wool composition containing 5.4% FeO. A linear shrinkage of 5% was measured for the coated wool+FeS when heated to 930° C., compared to 6% shrinkage for the standard composition.

Our mineral fiber compositions have a high SiO$_2$, low Al$_2$O$_3$ and low Fe$_2$O$_3$ content when compared to standard mineral fiber compositions. Our compositions have the following ingredients by weight percent:

| Ingredient | Weight Percent |
| --- | --- |
| SiO$_2$ | 47.0 to 59.5 |
| Al$_2$O$_3$ | 0 to 4.0 |
| CaO + MgO | 36.0 to 48.0 |
| Na$_2$O + K$_2$O | 0 to 5.0 |
| FeO | 0.1 to 4.0 |
|  | (total iron expressed as FeO) |
| S | 0.05–1.0 |
|  | (total sulfur expressed as S$^{2-}$) | wherein SiO$_2$+Al$_2$O$_3 \geq 51\%$, K1$\geq$40, and the iron present as Fe$^{2+}$ is greater than 50% of total iron. Regarding the 2$^+$/Fe$^{3+}$ ratio, Fe$^{2+}$ is certainly greater than 50 % and could be as high as 80%, or greater.

A preferred range for the ingredients is:

| Ingredient | Weight Percent |
| --- | --- |
| SiO$_2$ | 48.0 to 59.0 |
| Al$_2$O$_3$ | 0 to 3.0 |
| CaO + MgO | 37.0 to 47.0 |
| Na$_2$O + K$_2$O | 0 to 4.0 |
| FeO | 0.1 to 3.0 |
|  | (total iron expressed as FeO) |
| S | 0.05–0.8 |
|  | (total sulfur expressed as S$^{2-}$) | wherein SiO$_2$+Al$_2$O$_3 \geq 51\%$, MgO ranges from 4 to 32 %, CaO ranges from 15–43%, K1$\geq$40, and greater than 50% of the iron is present as Fe$^{2+}$.

| A more preferred range for the ingredients is: | |
| --- | --- |
| Ingredient | Weight Percent |
| SiO$_2$ | 49.0 to 58.0 |
| Al$_2$O$_3$ | 0.2 to 3.0 |
| CaO + MgO | 4.0 to 460 |
| Na$_2$O + K$_2$O | 0 to 3.0 |
| FeO | 0.1 to 3.0 |
| | (total iron expressed as FeO) |
| S | 0.1 to 0.5 |
| | (total sulfur expressed as S$^{2-}$) | wherein SiO$_2$+Al$_2$O$_3$≧52%, MgO ranges from 5 to 25 %, CaO ranges from 15–41% K1≧40, and greater than 50% of the iron is present Fe$^{2+}$.

The German regulation requires a numerical index (K1) greater than or equal to 40 to be considered free of suspicion. The index is calculated by K1=Σ(Na$_2$O, K$_2$O, CaO, MgO, BaO, B$_2$O$_3$)–2Al$_2$O$_3$. This places severe restrictions on alumina levels and anything not included in the index, such as silica.

Bulk nucleation and crystallization of mineral wool fibers is desirable when the fibers are to be used for high temperature applications. When fibers bulk nucleate and crystallize (as opposed to a random surface nucleation), they retain their fibrous nature after crystallization and thereby minimize shrinkage and also retain the desirable properties of fibers. Bulk nucleation and crystallization can be produced in the glasses of this invention by including sulfur in the composition and by melting the glass under reducing conditions.

To determine the mount of sulfide necessary to produce bulk nucleations in these glasses, we follow the procedures column 3 of U.S. Pat. No. 4,366,251 describes.

Basically, production of the present fibers contemplates two steps. First, silica, dolomite, clay, limestone or other suitable raw materials are melted in a crucible, pot, or continuous glass melting unit, depending on the quantity of product wanted and the manner of fiber formation to be utilized. Second, when a suitably homogeneous melt is attained, amorphous fibers are produced from the melt in any conventional manner such as drawing, spinning or blowing.

Regarding the equipment for the production of mineral wool, one may use any known melting furnace for the production of traditional mineral wool. Preferably, either a cupola furnace or an electric furnace may be employed in combination with any known spinning device.

The melts can be produced in a cupola furnace in which is loaded a mixture of the raw materials. Also added is the required quantity of coke for causing a burning and melting. If the melts are produced in an electric or gas fired furnace, a reducing agent such as powdered carbon is added to chemically reduce the melt. The melt can be fiberized in a traditional spinning aggregate comprising four spinner wheels connected in a cascade.

Coating the mineral fibers with a phosphorus compound is carried out by depositing a coat of one or more phosphorus compounds on the surface of the fibers. When the fibers are heated, their linear thermal contraction at 930° is less than 20 percent. The amount of the phosphorus compound which coats the surface of fibers is desired to fall in the range of from 0.5 to 10% by weight, computed as P$_2$O$_5$. The thermal contraction at 930° C. is particularly less than 10% when the content of phosphorus compound is limited to the range of from 1 to 5% by weight as P$_2$O$_5$.

Preferably, we adhere the phosphorus compound to the surface of the mineral fibers by spraying or other means of depositing a solution on the fibers. An alternative method is soaking the fibers in a solution containing a phosphorus compound such as, for example, a solution of a phosphate like MH$_2$PO$_4$, M$_2$HPO$_4$, MHPO$_4$ or M$_3$PO$_4$ (M denoting an alkali, alkaline earth and/or ammonium).

These phosphorous compounds may be applied with or without a binder, such as a phenolic binder. They may be applied to the mineral wool fibers either before the binder is applied, or at the same time as the binder is applied. In particular, they may be dissolved in the binder carrier, e.g., in water, or they may be suspended in the binder carrier. One function of binder, but not a requirement, is to adhere the phosphorous compounds to the mineral wool fibers.

Subsequent to the adhesion of the phosphorus compound to the surface of fibers, the fibers are drained when necessary, then gradually dried in a stream of air or forcibly dried by heating at an elevated temperature.

U.S. Pat. No. 4,194,914 more fully describes the phosphorus treating processes.

EXAMPLE 1

The following table contains an example of our mineral wool composition compared to a standard mineral wool composition:

TABLE 1

| Ingredients | Weight | |
| --- | --- | --- |
| | Standard Mineral Fiber | Inventive Mineral Fiber |
| SiO$_2$ | 45.4 | 51.0 |
| Al$_2$O$_3$ | 13.7 | 2.5 |
| Na$_2$O | 2.2 | 0.5 |
| K$_2$O | 0.5 | 0.2 |
| MgO | 11.3 | 11.8 |
| CaO | 19.6 | 32.9 |
| TiO$_2$ | 1.4 | 0.2 |
| FeO (total iron expressed as FeO) | 5.4 | 0.67 |
| S (total sulfur expressed as S$^{2-}$) | | 0.23 |
| Temperature (°C.) for a viscosity of 10 poise | 1461 | 1382 |
| Liquidus Temperature (°C.) | 1233 | 1322 |
| K1 | 6.2 | 40.4 |
| Fe Present: | | |
| as FeO | | 0.61 |
| as Fe$_2$O$_3$ | | 0.08 |

EXAMPLE 2

In an aqueous solution containing diammonium hydrogen phosphate in a concentration of 0.5%, we immersed the inventive fibers from Example 1. We pulled the fibers out of the aqueous solution and, with the excess solution adhering to the surface of fibers removed by simple drainage, dried at a temperature falling in the range of from about 100° C. to 125° C. In the fibers, the phosphorus compound was found to be contained in a concentration of 1.96% by weight, computed as P$_2$O$_5$. The fibers were tested for thermal contraction. The results confirmed by the test that the fibers of the present invention showed only about 5.0% linear contraction when heated up to about 930° C.

We claim:

1. A mineral fiber product comprising:
   at least one mineral fiber made from a fiber composition comprising SiO$_2$ in an amount of from 47.0 to 59.5 weight percent, $Al_2O_3$ in an amount of from 0 to 4.0 weight percent, CaO and MgO in a total amount of from 36.0 to 48.0 weight percent, $Na_2O$ and $K_2O$ in a total amount of from 0 to 5.0 weight percent, iron present as $Fe^{2+}$ or $Fe^{3+}$ an amount of from 0.1 to 4.0 weight percent expressed as FeO, and sulfur in an amount of from 0.05 to 1.0 weight percent expressed as $S^{2-}$, wherein the sum of the weight percentages of $SiO_2$ and $Al_2O_3$ is greater than or equal to 51; and a coating on the fiber comprising a phosphorus compound in an amount providing a phosphorus content of from 0.5 to 10.0 weight percent calculated as $P_2O_5$.

2. A mineral fiber product as defined in claim 1, wherein said coating further comprises a binder.

3. A mineral fiber product as defined in claim 1, wherein said binder is a phenolic binder.

4. A mineral fiber product as defined in claim 1, wherein said phosphorus compound is a phosphate of the formula $MH_2PO_4$, $M_2HPO_4$, $MHPO_4$, or $M_3PO_4$, where M is an alkali metal, alkaline earth metal, or ammonium.

5. A mineral fiber product as defined in claim 1, wherein said phosphorus compound is $(NH_4)_2HPO_4$.

6. A mineral fiber product as defined in claim 1, wherein said phosphorus content is from 1.0 to 5.0 weight percent.

7. A mineral fiber product as defined in claim 1, wherein the sum of the weight percentages of any $Na_2O$, $K_2O$, CaO, MgO, BaO, and $B_2O_3$ minus two times the weight percentage of $AlO_3$ in the fiber composition is greater than or equal to 40.

8. A mineral fiber product as defined in claim 1, wherein greater than half of the amount of iron is present as $Fe^{2+}$.

9. A mineral fiber product as defined in claim 8, wherein the amount of $SiO_2$ is from 48.0 to 59.0 weight percent, the amount of $Al_2O_3$ is from 0 to 3.0 weight percent, the total amount of CaO and MgO is from 37.0 to 47.0 weight percent with the amount of MgO being from 4 to 32 weight percent and the amount of CaO being from 15 to 43 weight percent, the total amount of $Na_2O$ and $K_2O$ is from 0 to 4.0 weight percent, the amount of iron is from 0.1 to 3.0 weight percent expressed as FeO, the amount of sulfur is from 0.05 to 0.8 weight percent expressed as $S^{2-}$, and the sum of the weight percentages of any $Na_2O$, $K_2O$, CaO, MgO, BaO, and $B_2O_3$ minus two times the weight percentage of $Al_2O_3$ is greater than or equal to 40.

10. A mineral fiber product according to claim 9, wherein the amount of $SiO_2$ is from 49.0 to 58.0 weight percent, the amount of $Al_2O_3$ is from 0.2 to 3.0 weight percent, the total amount of CaO and MgO is from 40.0 to 46.0 weight percent with the amount of MgO being from 5 to 25 weight percent and the amount of CaO being from 15 to 41 weight percent, the total amount of $Na_2O$ and $K_2O$ is from 0 to 3.0 weight percent, and the amount of sulfur is from 0.05 to 0.8 weight percent expressed as $S^{2-}$.

11. A mineral fiber product according to claim 1, wherein the fiber has a linear thermal contraction at 930° C. of less than 20 percent.

12. A mineral fiber product comprising:

at least one mineral fiber made from a fiber composition comprising $SiO_2$ in an amount of 51.0 weight percent, $Al_2O_3$ in an amount of 2.5 weight percent, CaO in an amount of 32.9 weight percent, MgO in an amount of 11.8 weight percent, $Na_2O$ in an amount of 0.5 weight percent, $K_2O$ in an amount of 0.2 weight percent, $TiO_2$ in an amount of 0.2 weight percent, iron present as $F^{2+}$ or $Fe^{3+}$ an amount of 0.7 weight percent expressed as FeO with greater than half of the amount of iron being present as $Fe^{2+}$, and sulfur in an amount of 0.2 weight percent expressed as $S^{2-}$, wherein the sum of the weight percentages of any $Na_2O$, $K_2O$, CaO, MgO, BaO, and $B_2O_3$ minus two times the weight percentage of $Al_2O_3$ is greater than or equal to 40; and a coating on the fiber comprising a phosphorus compound in an amount providing a phosphorus content of from 0.5 to 10.0 weight percent calculated as $P_2O_5$.

13. A mineral fiber product as defined in claim 12, wherein said coating further comprises a binder.

14. A mineral fiber product as defined in claim 13, wherein said binder is a phenolic binder.

15. A mineral fiber product as defined in claim 12, wherein said phosphorus compound is a phosphate of the formula $MH_2PO_4$, $M_2HPO_4$, $MHPO_4$, or $M_3PO_4$, where M is an alkali metal, alkaline earth metal, or ammonium.

16. A mineral fiber product as defined in claim 12, wherein said phosphorus compound is $(NH_4)_2HPO_4$.

17. A mineral fiber product as defined in claim 12, wherein said phosphorus content is from 1.0 to 5.0 weight percent.

\* \* \* \* \*